(12) United States Patent
Rattunde

(10) Patent No.: US 7,684,055 B2
(45) Date of Patent: Mar. 23, 2010

(54) MEASURING STATION FOR A PIPE CUTTING MACHINE

(75) Inventor: Ulrich Rattunde, Bentwisch (DE)

(73) Assignee: Rattunde & Co. GmbH, Ludwigslust (DE)

( * ) Notice: Subject to any disclaimer, the term of this patent is extended or adjusted under 35 U.S.C. 154(b) by 110 days.

(21) Appl. No.: 11/991,563

(22) PCT Filed: Aug. 24, 2006

(86) PCT No.: PCT/DE2006/001474

§ 371 (c)(1),
(2), (4) Date: Mar. 6, 2008

(87) PCT Pub. No.: WO2007/028352

PCT Pub. Date: Mar. 15, 2007

(65) Prior Publication Data

US 2009/0116038 A1 May 7, 2009

(30) Foreign Application Priority Data

Sep. 9, 2005 (DE) ........................ 10 2005 043 223

(51) Int. Cl.
*G01B 11/24* (2006.01)
(52) U.S. Cl. .................................................... 356/608
(58) Field of Classification Search ......... 356/607–608, 356/615, 622, 629, 639, 635, 383, 387; 700/218, 700/217; 73/149, 865.8; 250/223 R, 223 B, 250/224, 559, 561, 222 R
See application file for complete search history.

(56) References Cited

U.S. PATENT DOCUMENTS 4,063,820 A * 12/1977 Borgese ...................... 356/625

(Continued)

FOREIGN PATENT DOCUMENTS

DE 3834052 A1 4/1990
DE 4444787 A1 12/1995

OTHER PUBLICATIONS

International Search Report in priority application PCT/DE2006/001474, mailed Dec. 4, 2006, and citing two above-referenced foreign patent documents (3 pages).

(Continued)

*Primary Examiner*—Tarifur R. Chowdhury
*Assistant Examiner*—Isiaka O Akanbi
(74) *Attorney, Agent, or Firm*—Nash and Titus, LLC

(57) ABSTRACT

The invention relates to a measuring station, especially for a pipe cutting machine (2), with a first distance sensor (8) that can pivot about a transverse axis (16) by a drive (13) for generating a first scanning beam (6) that scans an object (4) during the continuous pivoting motion and measures first distance measured values in a clocked manner, and with a second distance sensor (19) that is stationary as regards the transverse axis (16) for generating a second scanning beam (22) that is directed onto a angle measuring apparatus (21) connected in a non-rotating manner to the first distance sensor (8) and that measures second distance measured values in a clocked manner, and with an electronic synchronization unit (17) comprising connections for the first and the second distance measured signals, and with a calculating unit (18) that calculates a profile of the object (4) to be measured from the synchronized distance measured signals.

14 Claims, 2 Drawing Sheets

U.S. PATENT DOCUMENTS

| | | | | |
|---|---|---|---|---|
| 4,152,767 | A | * | 5/1979 | Laliotis ..................... 356/635 |
| 5,726,366 | A | * | 3/1998 | Washio et al. ............... 73/865.8 |
| 5,953,127 | A | * | 9/1999 | Washio et al. ............... 356/634 |
| 6,847,859 | B2 | * | 1/2005 | Nuebling et al. ............ 700/217 |

OTHER PUBLICATIONS

International Preliminary Report on Patentability in priority application PCT/DE2006/001474, mailed Apr. 8, 2008 (6 pages, in English).

* cited by examiner

MEASURING STATION FOR A PIPE CUTTING MACHINE

This application claims priority from PCT/DE2006/001474 (filed Aug. 14, 2006) and German application DE 10 2005 043 223.9 (filed Sep. 9, 2005). The entire contents of these documents are incorporated herein by reference.

The invention relates to a measuring station, especially for a cutting machine for rod-shaped profile material and a process for determining the profile of an object, especially of a rod-shaped profile material end. The invention also relates to a machine for cutting rod-shaped profile material to length with at least one measuring station.

BACKGROUND OF THE INVENTION

Pipe cutting machines cut pipe sections to length. In modem pipe cutting machines an integrated post-treatment of the cut-to-length pipe section takes place in the form of deburring and/or chamfering the pipe ends. It is necessary in a high-precision working of pipes to check the pipe ends individually after the working procedure, especially in order to control the chamfering angle, the wall thickness and the inside and outside diameter of the pipe end, the plane course and the front cut. External measuring stations for checking the cited parameters are basically known in the state of the art. In them, the cut-to-length pipe section is removed from the pipe cutting machine and introduced into the external measuring station. In order to measure the profile of the pipe end, mechanical sensors are used in the form of rolling heads in a known manner. This form of measuring is precise but also very time-consuming.

SUMMARY OF THE INVENTION

The invention addresses the need for an economical and rapid measuring station, especially for a cutting machine for cutting rod-shaped profile material to length and a process for determining the profile of rod-shaped profile material ends in particular.

This problem is solved by this invention in a generic measuring station with a first distance sensor that can pivot about a transverse axis by a drive for generating a first scanning beam that scans an object during the continuous pivoting motion and measures first distance measured values in a clocked manner, and with a second distance sensor that is stationary as regards the transverse axis for generating a second scanning beam that is directed onto a angle measuring apparatus connected in a non-rotating manner to the first distance sensor and that measures second distance measured values in a clocked manner, and with an electronic synchronization unit comprising connections for the first and the second distance measured signals, and with a calculating unit that calculates a profile of the object to be measured from the synchronized distance measured signals.

DETAILED DESCRIPTION OF THE INVENTION

Figure 1:
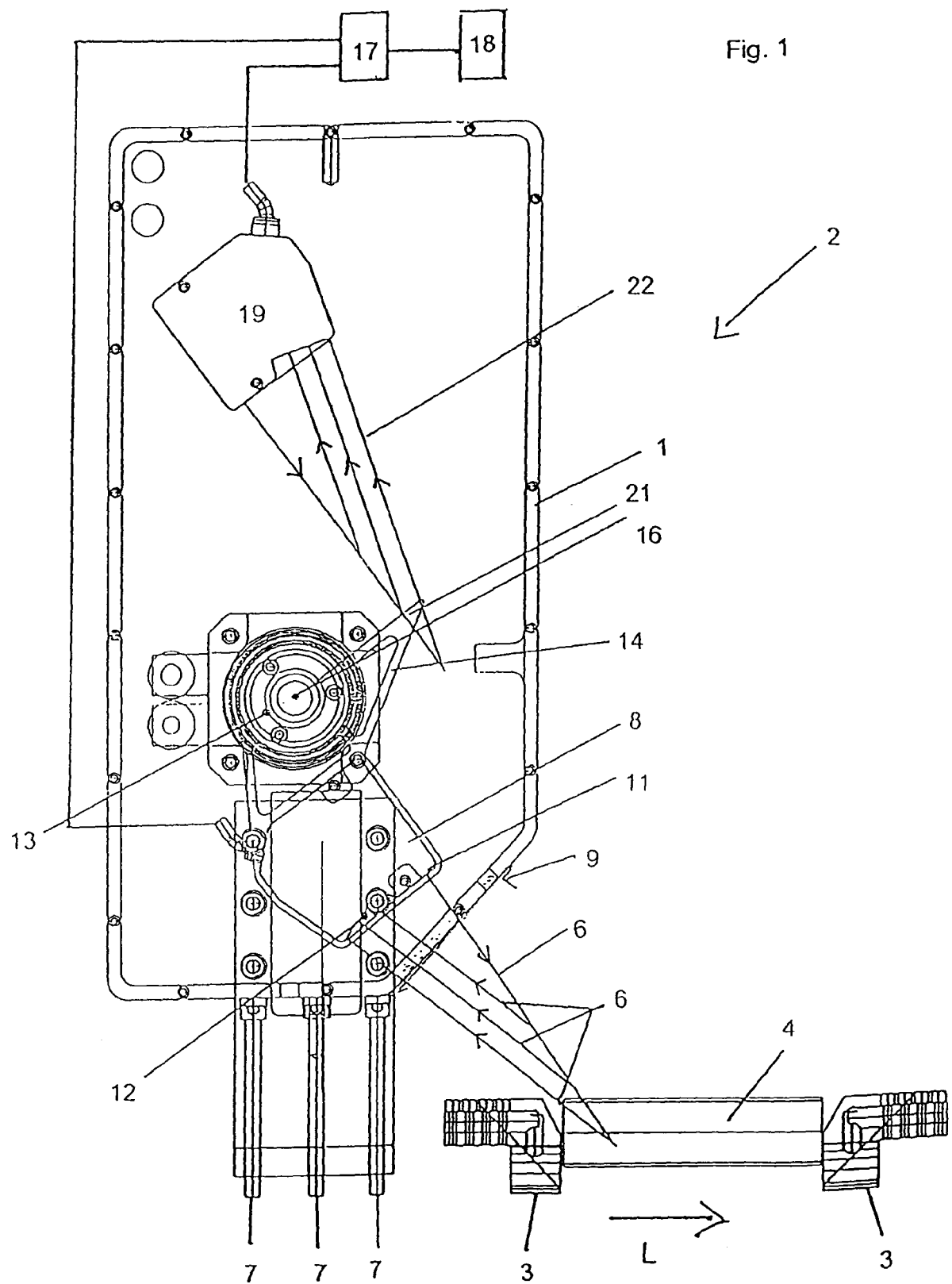
FIG. 1 shows a section view of the measuring station of the invention and of a clamped-in pipe to be measured.

The inventor surprisingly discovered that the profile of objects, in particular of rod-shaped profile material ends, can be precisely determined with only two distance sensors. The term "profile" denotes here the spatial shape of an end of a rod-shaped profile material, in particular of a pipe end. In pipes the profile of the pipe end is determined by parameters such as the chamfering angle, the wall thickness and the inside and outside diameter, the plane course and the front cut.

On the other hand, the concept of the rod-shaped profile material is to be understood as a generic concept, in particular for rod-shaped solid materials, pipes and rod-shaped profiles and is to be distinguished from that of the profile as the spatial shape of the end of a rod-shaped profile material.

Laser sensors are preferably used as distance sensors. Traditional laser sensors make it possible to measure 50,000 distance values per second. They are thus very precise and rapid.

According to the invention the first distance sensor can pivot about a transverse axis, preferably in a continuous manner. The continuous pivoting movement makes an especially rapid measuring possible. The transverse axis is advantageously arranged transversely to the longitudinal direction of the rod-shaped profile material.

The first scanning beam of the first distance sensor is directed in the direction of the object to be measured. The first scanning beam passes over a longitudinal section of the object in a pivoting movement. The first distance sensor measures first distance measured values of object points to the first distance sensor. The first distance sensor, constructed as the first laser sensor, comprises a first laser and a first CCD camera. The first laser beam departing from the first laser strikes the object to be measured and reflects diffusely. A small part of the diffusely reflected laser beam strikes the first CCD camera focused on the striking point of the laser beam on the object. The distance measured values of the object point to the laser sensor are converted into distance measured signals.

The scanned profile of the longitudinal section of the object can be calculated with the calculating unit from the first distance measured signals. However, for this it is also necessary to determine for advantageously each first distance measuring point the exact angular position of the pivotable first distance sensor about the transverse axis. The scanned profile of the object, in particular the end of the pipe section, can be calculated in a sufficiently exact manner from the angular position of the first distance sensor about the transverse axis and from the first distance measured values, given a sufficient number of measured signal pairs.

The first distance sensor is most advantageously supported in a holder that is connected in a non-rotating manner to a servomotor. The servomotor oscillates about a transverse axis and it generates an oscillating pivoting movement of the first distance sensor. Traditional servomotors also allow a clocked output of actual angular values so that the angular position of the first distance sensor can basically determined by the actual value output of the servomotor. However, traditional servomotors have a distinctly lesser clocking then the laser sensors described above. The clocking of the laser sensors is usually approximately 50 kHz. However, the commercial servomotor makes actual values for determining positions available with a frequency of approximately 150 Hz, that is, only 150 position determinations per second are made possible. But then on the one hand not even approximately all first distance measured values are evaluated and on the other hand there is the synchronization problem of associating the appropriate first distance measured value with each angular measured value.

This is where the invention begins. It makes use of the idea of performing the angular determination of the first distance sensor about its transverse axis by a second distance sensor with the same clocking and precision, preferably a sensor with the same construction. According to the invention a second scanning beam of the second distance sensor is directed onto an angle measuring apparatus arranged in a non-rotating manner on the holder of the first distance sensor. The angle measuring apparatus is advantageously built as an angle measuring plate, preferably with a reflecting coating facing the second distance sensor. Depending on the angular position of the first distance sensor, the angle measuring plate has another distance to the second distance sensor that is stationary relative to the transverse axis. The angular position of the first distance sensor can be calculated from the distance of the angle measuring plate to the second distance sensor. The synchronization problems are solved by using two similar distance sensors, preferably with the same clocking. It is actually possible to connect the first distance sensor in the form of a first laser sensor and the second distance sensor in the form of a second laser sensor with the same construction to a traditional synchronization unit that synchronizes the two distance measured values than supplies them to a calculating unit. A profile of the rod-shaped profile material end can be determined in the calculating unit from the synchronized distance measured signal pairs.

In a preferred embodiment of the invention the cut-to-length profile material section is supported on a rotation device arranged at the discharge of a cutting machine. The cutting machine for cutting rod-shaped profile material to length throws out the cut-to-length profile material sections in the discharge. A rotation device, e.g., in the form of spaced rollers rotating in the same direction can be provided there between which they cut-to-length section is received and rotated with a frequency corresponding substantially to the frequency of the rotating rollers. The frequency is preferably approximately 1 Hz. The measuring of a rod-shaped profile material end is possible within one second in the measuring station in accordance with the invention. The rod-shaped profile material end rotates completely about its longitudinal axis one time during the one second.

In this first second the servomotor oscillating with a frequency of approximately 6 Hz make six back-and-forth movements of the first laser sensor so that the laser beam completely passes over the rod-shaped profile material twelve times and therefore measures twelve longitudinal sections spaced from each other by the same angle. In particular, the inside and outside chamfering angle, the pipe wall thickness, the inside and outside diameter of the pipe as well as the size of the front surface and the front cut of the pipe can be determined by the measuring station of the invention.

The three-dimensional profile in particular of a pipe along its total circumference can be calculated sufficiently exactly by interpolation via the twelve longitudinal section measurements since the pipe end is substantially symmetrical with respect to rotation about its longitudinal axis.

The average two-dimensional profile of a longitudinal section of the pipe end is possible by averaging via the preferably twelve individual measurements of the longitudinal section.

The problem is solved in its second aspect by a process for determining the profile of an object in that a first distance sensor with a first scanning beam is continuously pivoted about a transverse axis by a drive and the object is scanned during the continuous pivoting movement, and first distance measured values are measured in a clocked manner, and a second scanning beam of a second distance sensor stationary relative to the transverse axis is directed onto an angle measuring apparatus connected in a non-rotating manner to the first distance sensor, and second distance measured values of the first distance sensor are measured in a clocked manner, and first and second distance measured signals are supplied to an electronic synchronization unit and synchronized there, and a profile of the object is calculated from the synchronized distance measured signals by a calculating unit.

The process is suitable for being carried out by one of the previously cited measuring stations.

The invention also relates to a machine for cutting rod-shaped profile material to length with a discharge for cut-to-length rod-shaped profile material sections and with a rotation device for the cut-to-length rod-shaped profile material sections and with a previously described measuring station arranged adjacent to the rotation device, in which the first scanning beam can be directed onto a rod-shaped profile material end of a rod-shaped profile material section that can be received in the rotation device.

It turned out that the previously described measuring station is suitable in particular for measuring the profile of pipe ends. Pipe ends can be completely determined by a few precise longitudinal section measurements even along their circumference on account of their design, which is symmetrical with respect to rotation. The particular longitudinal section measurements can be precisely carried out with one of the above-described measuring stations and/or processes.

The first distance sensor can pivot between two extreme positions. In its extreme positions it transmits extreme scanning beams. An extreme first scanning beam is directed onto an outer surface of the pipe end of the pipe section received in the rotation device. During the pivoting movement even a section of the inner wall of the pipe end is passed over. The cited parameters can be determined by such a relative arrangement of the first laser beam and the pipe end.

A measuring station is preferably provided in a machine for cutting rod-shaped profile material to length on opposite sides of the discharge. In this manner both ends of the rod-shaped profile material section can be measured even simultaneously.

The measuring station in accordance with the invention and the process in accordance with the invention are preferably determined for measuring metallic, rod-shaped profile materials, in particular metal pipes. The cutting machine in accordance with the invention is also preferably determined for cutting metallic, rod-shaped profile materials, in particular metal pipes.

The invention will be described using an exemplary embodiment in two figures.

The arrangement presented in FIG. 1 shows on the one hand the measuring station 2 arranged in a housing that has a rectangular cross section and is constructed with a beveled corner. On the other hand, a cut pipe section 4 placed on a rotation device 3 is provided adjacent to measuring station 2 onto which pipe section a first laser beam 6 is directed in order to determine its profile.

Measuring station 2 comprises three pins 7 projecting from its housing for fastening to the discharge for the cut pipe sections 4 of a pipe cutting machine (not shown). In housing 1 a first laser sensor 8 is pivotably arranged adjacent to the beveled corner of housing 1. Connected laser sensor 8 transmits the first laser beam 6 through a slot 9 out of the interior of housing 1 outward in the direction of one of the two pipe ends of pipe section 4. Slot 9 runs along the beveled corner wall from a front side to a longitudinal side of housing 1. In FIG. 1 slot 9 is in the plane of the drawing. Slot 9 is dimensioned and arranged in such a manner that it lets the departing first laser beam 6 out and also lets the first laser beam 6 diffusely reflected from the end of the clamped-in pipe into the interior of housing 1. The direction of the diffusely reflected light is indicated by directed arrows in FIG. 1. The first laser sensor 8 comprises, in addition to a laser 11 integrated in it, a CCD camera 12 for the diffusely reflected, first laser beam 6 as sensor. The position of first laser sensor 8 is determined in such a manner that the pivoting movement makes it possible to pass over the entire pipe width and that even diffusely reflected extreme laser beams 6e are still in the open a window of CCD 12.

The first laser sensor 1 is mounted in a holder 14 permanently connected to a servomotor 13. Servomotor 13 is arranged approximately centrally in the lower half facing the pipe cutting machine (not shown) in FIG. 1. Servomotor 13 rotates holder 14 about a transverse axis 16 that runs centrally through it and runs vertically to the plane of the drawing in FIG. 1. The first laser sensor 8 can pivot in the longitudinal direction of slot 9 on account of the rotation of servomotor 13. As a result of the pivoting movement the first laser beam 6 scans the end of pipe section 4, as will be explained in detail in the description for FIG. 2. The laser sensor LK-G 152 of the Keyence company is used here as the first laser sensor 8. The first laser sensor 8 has a measuring frequency of 50 kHz. That is, it carries out 50,000 distance measurements per second while first laser sensor 8 is continuously pivoted by servomotor 13. Servomotor 13 allows an oscillating pivoting movement with a frequency of 6 Hz, and thus, the first laser beam 6 pivots through the slot twelve times per second and measures twelve cut lines in longitudinal direction L of pipe section 4.

In order to determine the profile of the pipe end of pipe section 4, a knowledge of the exact angular position of first laser sensor 8 about transverse axis 16 is required in addition to the knowledge of the distance of individual measuring points of the pipe end to first laser sensor 8. In order to determine the angular position of the first laser sensor a second laser sensor 19 is arranged, in FIG. 1, in the upper half of housing 1 in a fixed position in housing 1. The first and the second laser sensors 8, 19 are similar in construction.

Second laser sensor 19 is directed to an angle measuring plate 21 projecting from holder 14 vertically to first laser beam 6 into the course of the second laser beam 22. Angle measuring plate 21 is designed in one piece with holder 14. Angle measuring plate 21 oscillates with holder 14 and first laser sensor 8 about transverse axis 16. As a result of the oscillation the distance of angle measuring plate 21 to second laser sensor 19 periodically decreases and increases. The angular position of first laser sensor 8 about transverse axis 16 can be calculated by calculating unit 18 on account of the distance measuring between angle measuring plate 21 and second laser sensor 19.

Second laser sensor 19 also has a clocking of 50 kHz and thus also makes 50,000 per second possible.

The clocking of first laser sensor 8 and the clocking of second laser sensor 19 are similar. The distance measured signals of the two laser sensor 8, 19 are supplied to a synchronization unit 17 and synchronized there, that is, distance measured values of the first laser sensor 8 and of the second laser sensor 19 that are measured at the same point in time are associated with each other there. The measured signal pairs associated with each other are then supplied to calculating unit 18 in which the profile of the pipe section end is calculated from the large number of measured signal pairs.

Pipe section 4 can be rotated by rotation device 3 about its longitudinal axis L. Pipe section 4 is preferably rotated once about its longitudinal axis L within one second. The measuring of pipe section 4 also takes a total of one second. The pipe end is ejected after a complete revolution and the next pipe end is received in rotation device 3 and measured.

Figure 2:
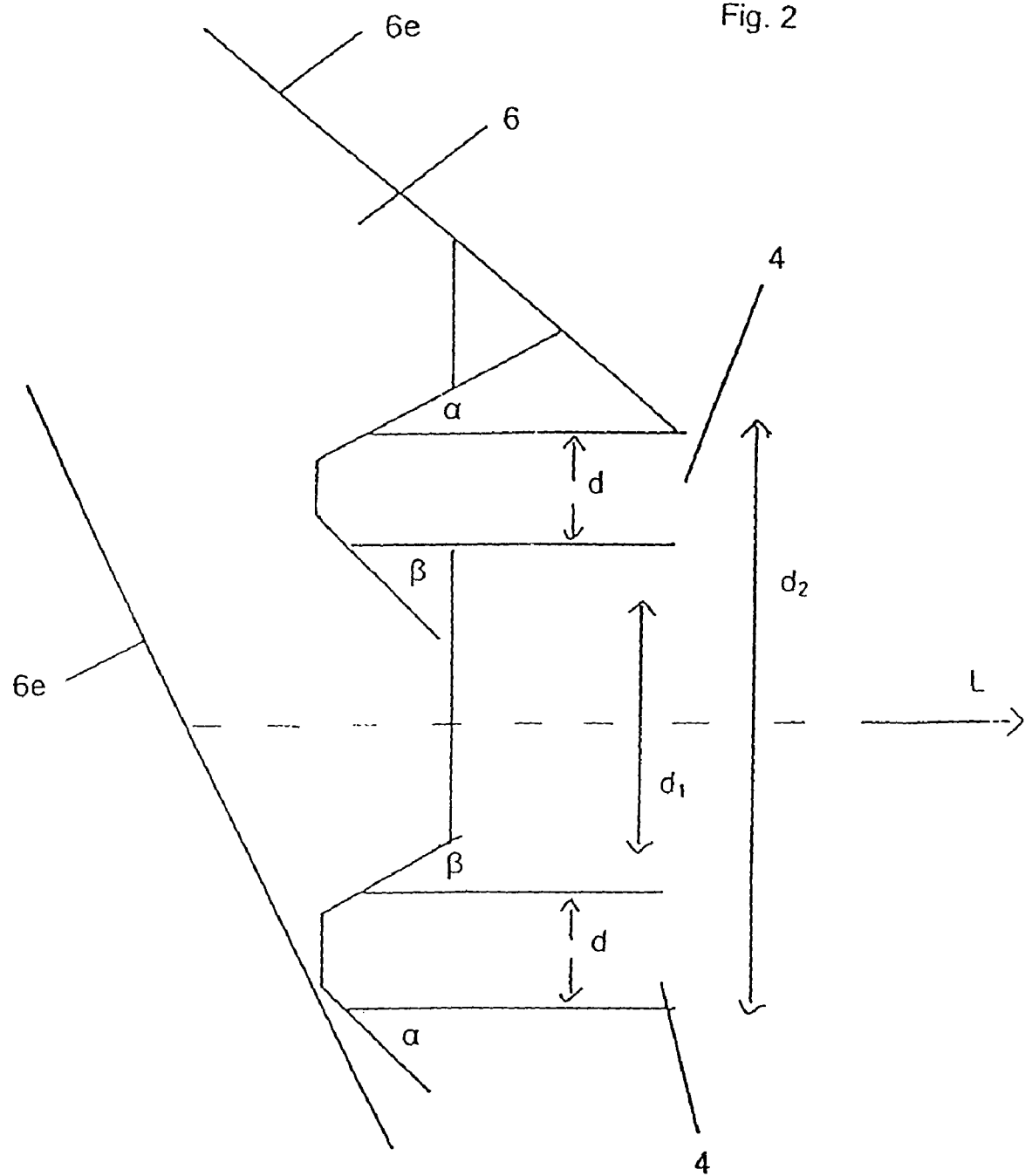
FIG. 2 shows a pipe end with measurable parameters.

FIG. 2 shows the pipe end of the pipe in FIG. 1 in a sectional view as well as the two sketched-in extreme laser beams 6e of first laser sensor 8. The first laser beam 6 oscillates with its measuring frequency of 50 kHz between the two extreme laser beams 6e with a frequency of 6 Hz, during which it passes over the end of pipe section 4 twelve times per second. During a complete oscillation, that is, two passes over the pipe end, approximately 8,300 measured values can be determined therewith. In the passed-over section shown in FIG. 2 the two outside chamfer angles $\alpha$ and the two inside chamfer angles $\beta$, the inside diameter $d_1$, the outside diameter $d_2$ as well as the width b of the front surface can be calculated by the measurements. The pipe section 4 designed to be substantially symmetrical with respect to rotation along its longitudinal axis L rotates once per second about its longitudinal axis L. The pipe end can be calculated in its three-dimensional shape by averaging and interpolation of the twelve section surfaces measured per second.

LIST OF REFERENCE NUMERALS 1 housing
2 measuring station
3 holder, rotation device
4 pipe section
5 -
6 first laser beam
6e extreme laser beam
7 pin
8 first laser sensor
9 slot
10 -
11 laser
12 CCD camera
13 servomotor
14 holder
15 -
16 transverse axis
17 synchronization unit
18 calculating unit
19 second laser sensor
20 -
21 angle measuring plate
22 second laser beam
$\alpha$ outside chamfer angle
$\beta$ inside chamfer angle
d1 inside diameter
d2 outside diameter
b width of the front surface
L longitudinal direction of the pipe section

The invention claimed is:

1. A measuring station for a cutting machine for rod-shaped profile material, comprising
  a first distance sensor that can pivot about a transverse axis by a drive, which first distance sensor generates a first scanning beam for scanning an object during a continuous pivoting motion and measures first distance measurement values of the object in a clocked manner,
  a second distance sensor that is stationary in relation to the transverse axis, which second distance sensor generates a second scanning beam that is directed onto a angle measuring apparatus connected in a non-rotating manner to the first distance sensor, which second distance sensor measures second distance measurement values of the object in a clocked manner, an electronic synchronization unit that receives and synchronizes first and second distance measurement signals, and a calculating unit that receives the synchronized first and second distance measurement signals and that calculates a profile of the object from the synchronized first and second distance measurement signals.

2. The measuring station according to claim 1, wherein the first and/or second distance sensor have a laser.

3. The measuring station according to claim 1, which further comprises a servomotor arranged on the first distance sensor, which servomotor generates a continuous pivoting movement about the transverse axis.

4. The measuring station according to claim 1, wherein the measurement of the first distance measurement in a clocked manner, and the measurement of the second distance measurement in a clocked manner, are clocked with the same frequency.

5. The measuring station according to claim 4, wherein the frequency is approximately 50 kHz.

6. The measuring station according to claim 3, wherein the servomotor generates a pivoting frequency of approximately 6 Hz.

7. The measuring station according to claim 1, which further comprises a rotation device for the object to be measured with a rotation frequency of approximately 1 Hz.

8. The measuring station according to claim 1, wherein the angle measuring apparatus comprises an angle measuring plate that reflects the second scanning beam.

9. A process for determining the profile of an object, comprising the steps of
(i) scanning an object by a first distance sensor having a first scanning beam, which first distance sensor is continuously pivoted about a transverse axis by a drive, so that the object is scanned during the continuous pivoting movement,
(ii) measuring first distance measurement values in a clocked manner,
(iii) directing onto an angle measuring apparatus a second scanning beam of a second distance sensor, which second distance sensor is stationary relative to the transverse axis, and which angle measuring apparatus is connected in a non-rotating manner to the first distance sensor,
(iv) measuring second distance measurement values of the first distance sensor in a clocked manner,
(v) supplying first and second distance measurement signals to an electronic synchronization unit and synchronizing the signals in the electronic synchronization unit,
(vi) and calculating a profile of the object by a calculating unit that receives the synchronized first and second distance measurement signals from the electronic synchronization unit.

10. The process according to claim 9, wherein first and second laser sensors are used in steps (i) and (iii).

11. The process according to claim 9, wherein the object is substantially symmetrical with respect to rotation about a longitudinal axis (L), and wherein during the continuous pivoting of the first distance sensor in step (i) the object is rotated about the longitudinal axis (L) during which sections of the object are scanned.

12. The process according to claim 11, wherein a three-dimensional and/or two-dimensional average profile of the object is calculated from the measured sections.

13. The process according to claim 9, wherein the first scanning beam oscillates with a frequency of approximately 6 Hz about the transverse axis, during which the first distance measurement values are measured with a first clocking of approximately 50 kHz, and second distance measurement values are measured with a second clocking of approximately 50 kHz, and the object is rotated at approximately 1 Hz.

14. A machine for cutting to length rod-shaped profile material, comprising a discharge for cut-to-length profile material sections, a rotation device for the cut-to-length profile material sections, and at least one measuring station,
wherein the at least one measuring station comprises
a first distance sensor that can pivot about a transverse axis by a drive, which first distance sensor generates a first scanning beam for scanning an object during a continuous pivoting motion and measures first distance measurement values of the object in a clocked manner,
a second distance sensor that is stationary in relation to the transverse axis, which second distance sensor generates a second scanning beam that is directed onto a angle measuring apparatus connected in a non-rotating manner to the first distance sensor, which second distance sensor measures second distance measurement values of the object in a clocked manner,
an electronic synchronization unit that receives and synchronizes first and second distance measurement signals,
and a calculating unit that receives the synchronized first and second distance measurement signals and that calculates a profile of the object from the synchronized first and second distance measurement signals
wherein the at least one measuring station is arranged adjacent to the rotation device, and wherein the first scanning beam can be directed onto a profile material end of a profile material section that can be received in the rotation device.

* * * * *